United States Patent [19]
Yamada et al.

[11] Patent Number: 5,675,970
[45] Date of Patent: Oct. 14, 1997

[54] RANKINE CYCLE POWER GENERATION SYSTEM AND A METHOD FOR OPERATING THE SAME

[75] Inventors: Akira Yamada; Yoshinari Hori, both of Hitachi; Yasuo Koseki, Hitachioota; Ryuichi Kaji, Tokyo, all of Japan

[73] Assignee: Hitachi, Ltd., Tokyo, Japan

[21] Appl. No.: 534,825

[22] Filed: Sep. 27, 1995

[30] Foreign Application Priority Data

Sep. 30, 1994 [JP] Japan .................................. 6-236387

[51] Int. Cl.⁶ ...................................................... F01R 13/00
[52] U.S. Cl. ............................................. 60/670; 60/645
[58] Field of Search ............................... 60/670, 645, 643

[56] References Cited

U.S. PATENT DOCUMENTS

| | | | |
|---|---|---|---|
| 4,240,260 | 12/1980 | Gustafson | 60/670 |
| 4,479,354 | 10/1984 | Cosby | 60/670 |
| 5,255,519 | 10/1993 | Kakovitch | 60/670 |

FOREIGN PATENT DOCUMENTS 510107  1/1993  Japan .

*Primary Examiner*—Ira S. Lazarus
*Assistant Examiner*—Alfred Basichas
*Attorney, Agent, or Firm*—Antonelli, Terry, Stout & Kraus, LLP.

[57] ABSTRACT

A high efficiency and economic refuse incineration power generation system capable of stable and continuous refuse incineration operation which can adapt to fluctuation in calorific values in the refuse incinerator has been provided, wherein the same system comprises the refuse incinerator having the heat exchanger through which the medium flows, the steam turbine which is coupled to the generator, and the refrigerator which supplies cooling water to the condenser, and wherein the medium discharged from the steam turbine is circulated to the boiler via the condenser where the medium is condensed to a condensate by enhanced cooling, a portion of the vapor generated in the refuse incinerator is branched in the upper stream of the steam turbine to be supplied to the refrigerator, and the working medium discharged from the refrigerator is caused to converge with the medium flow discharged from the condenser.

13 Claims, 10 Drawing Sheets

RANKINE CYCLE POWER GENERATION SYSTEM AND A METHOD FOR OPERATING THE SAME

BACKGROUND OF THE INVENTION

The present invention relates to refuse incineration exhaust heat power generation system (hereinafter referred to as refuse incineration exhaust heat power generation system or simply refuse power generation plant), and in particular, it relates to a Rankine cycle power generation system suitable for achieving a high-efficiency refuse power generation plant.

At present, most of combustible municipal waste or refuse are disposed through incineration by each community, and exhaust heat obtained during incineration is utilized to produce hot water or steam to supply to public bath, hot water pool and power generation, or the like.

Nowadays, with changing life styles and growing utilization of office automation equipment, volumes of combustible refuse or waste such as paper trash, and in consequence, calorific values due to refuse incineration are on the increase. On one hand, finding and securing of further dumping sites, although it is very pressing, is becoming very difficult. In particular, in urban communities, such a situation as above poses a serious social problem.

On the other hand, electric power demand is increasing significantly every year, and in particular, the electric power demand during summer season and, in particular, day-time in urban cities is substantially increasing due to an increasing number of air-conditioners in home, thereby, construction or addition of new power generation installations is obliged in order to supplement such increases in the power demand.

Thereby, as one approach to solve such problems as described above associated with urban cities, and further to help solve the global environmental problems, each community and municipal organization are regarding municipal waste and refuse as a useful and valuable resource, and discussing introduction of refuse power generation plants which use steam obtained by recovering exhaust heat from refuse incineration.

In refuse power generation plants, however, in most cases there are included corrosive components such as chlorine gas in exhaust gases from refuse incineration, thereby, heat transfer piping in a steam generator for recovering exhaust heat from such exhaust gas is very likely to be corroded. Since such corrosion of the heat transfer piping becomes significant with increasing temperatures, the temperature of steam at turbine inlet in the refuse incineration exhaust heat power generation is limited to approximately 300° C. at highest.

As one solution to solve the above problem, Japanese Patent Application Laid-Open No.5-10107 discloses a method for improving power generation efficiency through steps of superheating the steam obtained from refuse incineration exhaust heat with a high-temperature exhaust gas which has been discharged from a gas turbine after having driven the turbine, and admitting a superheated steam thus obtained into a steam turbine to generate electricity.

However, since the foregoing power generation system needs a gas turbine power generation system in addition to a refuse incineration steam turbine power generation system, a substantial increase in installation cost is unavoidable. Further, costly fuels such as various types of gasses, oil and the like will be needed to operate such plants.

Still further, there are such problems as follows. Since such steam turbine power generation system and gas turbine power generation system are coupled closely, a highly sophisticated operational technique and a very stringent maintenance control are required, and in case the gas turbine generation system halts its operation due to some cause, the steam turbine power generation system will be forced to operate singly at a very low power generation efficiency, or in a worst case, the operation of a refuse incinerator will have to be halted, thereby significantly impairing the proper refuse disposal operation.

On the other hand, it is very seldom for such refuse power generation plants to be sited in regions along the coastline as industrial power generation plants. By and large, in consideration of a responsible area to cover to collect refuse, they are sited in areas relatively remote from the coastline where cooling water including sea water is available. In addition, utilization of river water is avoided as much as possible to prevent infringement on the right of water and the like. Thereby, as to a condenser for condensing exhaust steam from the steam turbine, air-cooled condensers are presently preferred in most cases. Therefore, a condensing temperature available for condensing steam turbine exhaust by cooling in this system is usually limited to approximately 60°–70° C. (saturation pressure at this time: 0.2–0.3 $kg/cm^2$), the values of which are substantially higher compared to those of the temperature and pressure of the exhaust from usual industrial large-scale power generation plants in which sea water or the like is used as a cooling water to cool the condensing temperature as low as 30°–40° C. (saturation pressure at this time: 0.04–0.08 $kg/cm^2$)

Thereby, in the conventional refuse power generation plant, a low efficiency Rankine cycle operation is obliged due to the aforementioned limitations.

On the other hand, in order to solve such problems, there may be conceived a cooling tower/water-cooled condenser system which combines a cooling tower and a water-cooled condenser to condense the steam turbine exhaust at a temperature lower than obtainable in the air-cooled condenser. This system, however, requires installation of an additional cooling tower which will increase the installation cost substantially, thereby it is not practical.

Moreover, in the refuse power generation plant, since calorific values vary substantially due to the nature of the refuse and waste to be incinerated, it is known that a quantity of steam generated undergoes a change with time relative to a constant feed of refuse to the incinerator. Thereby, there is adopted such a method whereby a portion of the steam generated is constantly discharged out of the power generation system, and a quantity of the steam to be discharged is controlled such that a steam to be supplied to the steam turbine is maintained at a predetermined value constantly. Thereby, there is such a disadvantage that a portion of the useful steam having been produced as a result of recovery of the refuse incineration exhaust heat is discharged without contributing to electric power generation, thereby unwisely wasting the refuse incineration recovery heat, and reducing the thermal efficiency in long run.

SUMMARY OF THE INVENTION

The object of the present invention is to provide a Rankine cycle power generation system capable of improving the Rankine cycle efficiency in the refuse power generation plant which can adapt to changes or fluctuation in calorific values obtainable in refuse incinerators and further take into account economic power generation.

According to the invention, the aforementioned problems associated with the prior art are solved, and a refuse incineration exhaust heat power generation system can be provided that is capable of generating electricity with an improved efficiency and utilizing the steam obtainable from the refuse incineration exhaust heat most effectively.

In a Rankine cycle power generation system according to the invention having a boiler including a heat exchanger through which a medium flows, a steam turbine coupled to a generator, and a condenser in which a steam of the medium discharged from the steam turbine is condensed and from which a condensate is recirculated to the boiler, the boiler may be a refuse incinerator in which a total volume of steam of the medium vapor produced will change relative to a constant input of fuel supply, a predetermined amount of steam which is smaller than a minimum total amount of steam available as a result of the fluctuation is supplied to the steam turbine, and a surplus amount of steam of the medium exceeding the foregoing predetermined amount (including a fluctuating portion), after having worked to damp the fluctuation (for example, by damping the fluctuation through condensing the steam into a liquid (condensate) ), is converged with the medium returned from the condenser.

The aforementioned refuse incinerator in which the amount of steam of medium produced undergoes a change relative to a constant fuel supply amount may include such an instance in which a calorific value (or steam production) fluctuates with time even during a steady state operation of a boiler, or in which the calorific value (or steam production) fluctuates relative to a unit weight(or volume) of fuel (refuse) input.

The foregoing predetermined amount of steam and the extra amount of steam exceeding the predetermined amount can be defined in distinct relative to a total amount of steam generated in the refuse incinerator as schematically illustrated in the drawing of FIG. 10. Even under a constant state of operation of the refuse incinerator, the steam produced will undergo a fluctuation as shown in the drawing. Further, the foregoing predetermined amount of steam is preferably changed according to a particular time zone of the day. For example, it may be changed according to plural time zones of the day divided into 2 or more. Further, even when ther arises an instance the steam turbine will have to be stopped, for example, by failure or for inspection, the predetermined amount of steam to be supplied to the steam turbine can be cut off its supply and is supplied to a refrigeration unit, thereby the refuse incineration is ensured to continue its operation.

According to the invention as described above, from any incinerator such as a refuse incinerator in which the steam production amount fluctuates with time relative to a constant input of fuel (refuse), a stable amount of steam can be supplied to a steam turbine, and such fluctuation can be moderated as well thereby ensuring the medium to be recirculated stably.

Further, according to the invention, there is provided a refrigerating unit which supplies a cooling water to the condenser, and a portion of steam of the medium produced in the refuse incinerator is branched in the upper stream of the steam turbine to be supplied to the refrigeration unit as a heat source, and then a flow of condensate of the medium condensed in the refrigerating unit is converged with a flow of the medium discharged from the condenser. The foregoing refrigerating unit is preferably an absorption refrigerator.

According to the invention, the exhaust heat produced in the refuse incinerator can be utilized most effectively, and loss of heat can be minimized.

The refrigerating unit is preferably provided with a storage vessel for storing a cooling water or cold water producing source.

The cold water producing source is such a substance that generates a cooling water. In the absorption refrigerator, it is a strong absorption solution and a refrigerant, and in particular, the strong absorption solution. In a compression refrigerator, it is a compressed refrigerant, for example. Further, preferably, they can be stored in a container or the like.

The refrigerator of the invention is provided with an absorption liquid and a refrigerant liquid, a weak absorption solution diluted by the refrigerant liquid is heated by the medium vapor supplied thereto to be concentrated and separate the refrigerant. A strong absorption liquid and a separated refrigerant liquid obtained above are used as a new cold water producing source for cooling the cooling water returned from the condenser, or stored temporarily in respective storage vessels for the absorption liquid and refrigerant liquid. They can be used afterward on demand for cold water production. The cooling water is adapted to recirculate between the condenser and the refrigerator.

Further, it can be arranged according to the invention such that a direct contact (mixing) is prevented between the absorption solution or refrigerant of the refrigerator and the medium which recirculates from the refuse incinerator, turbine condenser, to the refuse incinerator. Thereby, corrosion of the heat exchangers in the refuse incinerator and the other parts can be suppressed substantially.

The foregoing condenser has a function to condense the medium vapor (gas) produced in the refuse incinerator into a liquid. When the medium is water, it condenses steam into water.

According to the invention, a junction at which two medium flows converge is placed between the condenser and the refuge incinerator, thereby the medium having a low temperature from the condenser and the medium having a high temperature from the refrigerator are converged before introducing into the refuse incinerator. Thereby, since the medium discharged from the condenser is preheated before it is returned to the boiler, the amount of steam production can be increased to ensure a high-efficiency operation. In addition, the refrigerator of the invention can be operated at an improved efficiency. Further, there may be provided a mixer 910 as shown in FIG. 11 for mixing converging medium flows having different temperatures to have a uniform temperature in the downstream thereof.

The refuse incinerator according to the invention is such one that produces heat by incinerating combustible refuse and waste. The refuse incinerator suitable for implementing the invention is preferably such one that is essentially capable of a continuous operation. For example, it is an incinerator that is capable of continuous operation throughout night-and-day except for a predetermined instance for a maintenance or the like. The foregoing refuse may include home garbages/combustibles, industrial combustible wastes or anything that can be disposed of by incineration.

The foregoing medium may be anything so long as the liquid of which can be heated by the heat exchanger in the incinerator into a vapor that can be introduced to the steam turbine. For example, it may be water or a liquid having water as a main component.

According to the invention, a portion of heat produced in the refuse incinerator can be utilized in the refrigerator, for example, in concentration of a weak absorption solution therein. That is, heat can be supplied to the refrigerator as a heat source. For this purpose, heat may be supplied to the refrigerator by means of conversion to another medium.

The foregoing medium or its vapor (steam) is branched in the upperstream of the steam turbine where an adjusting mechanism is provided for adjusting steam flow, thereby an amount of the vapor to the steam turbine and an amount thereof to the refrigerator can be controlled.

For example, it can be arranged such that in a time zone when a unit price of electricity is low, amount of supply to the steam turbine is reduced, and in another time zone when a unit price of electricity is high, the amount of supply to the steam turbine is increased. Further, it can be also arranged such that a predetermined amount of steam is secured to be supplied to the steam turbine, and a surplus amount thereof is supplied to the refrigerator which is effectuated to absorb such fluctuation in the steam production. Thereby, even under preence of fluctuation of calorific values in exhaust heat from refuse incineration, the steam turbine can be operated steadily with stable supply of steam. The aforementioned branch junction can be provided with a flow regulating mechanism or flow controller which, upon calculation of an appropriate amount of steam to be introduced into the turbine in order for at least one of a steam supply amount to the turbine, a steam turbine output and a generated electricity to be set at a preferred value, adjust the flow of the predetermined amount of steam to the steam turbine and the flow of the surplus amount of steam to the refrigerator. Thereby, the remaining steam exceeding the predetermined amount for the turbine can be supplied to the refrigerator.

The aforementioned branch portion can divide the medium flow from the heat exchanger of the refuse incinerator into a flow line leading to the steam turbine and another flow line leading to the refrigerator. Since the medium is branched in the state of steam, the amount of steam to be supplied to the turbine can be easily adjusted. The medium may be branched into a steam turbine supply line and a refrigeration supply line in the heat exchanger as well.

It may also be arranged such that the medium is branched before entering the heat exchanger into the steam turbine supply line and the refrigerator supply line, and each of the branched medium enters each heat exchanger provided separately. In this arrangement, since the medium is branched in the liquid state still at a relatively low temperature, such mechanical properties, heat resistance, strength and the like as required for the branch portion facility in the foregoing arrangement will not be necessary, and materials with properties adequate for lower steam condition will suffice. Prerequisite conditions such as amount of steam of the medium to be supplied to the steam turbine and the like can be calculated, for example, from the temperature in the refuse incinerator, flows of the medium or the vapor thereof and the like, so as to adjust each medium flow in each supply line.

According to the invention, even when the amount of medium steam production in the refuse incinerator fluctuates, substantial changes in steam flow to the steam turbine can be suppressed, that is, a predetermined steam flow can be secured to supply to the steam turbine, by regulating the steam flow to supply to the refrigerator such as to absorb the fluctuation, and further by converting the medium vapor to liquid in the refrigerator, which is then converged with the medium discharged from the condenser, thereby ensuring a stable operation of the steam turbine free from fluctuation in vapor supply.

Further, according to the invention, it may also be arranged such that heat is supplied in another form of energy, that is, a combustion gas exhausted from the refuse incinerator is coupled to the refrigerator unit to supply heat directly. The aforementioned combustion gas is a combustion exhaust gas produced by refuge combustion. This arrangement ensures more steam of the medium produced to be used in generation of electricity, since steam flow of the medium to the refrigerator can be reduced compared to the former arrangement. This is further advantageous in that more compact equipment in size can be provided.

Still further, according to the invention, it may be arranged such that the foregoing refuge incinerator includes the foregoing heat exchanger (which may be defined as a first heat exchanger) and a second heat exchanger through which a second medium flows, wherein the second medium flowing into the second heat exchanger is directed from the second heat exchanger to the refrigerator.

The second medium may have the same composition as the first medium, however, it is desirable that the first medium and the second medium are provided in a separate independent system respectively, and will not mix each other in their operation. The second medium flowing through the second heat exchanger can contribute to the operation of the refrigerator as well.

Further, it may be arranged according to the invention such that at least either one of the foregoing medium, the foregoing medium vapor and the foregoing combustion gas to be supplied to the refrigerator is caused to pass through a heat exchanger to exchange heat with the medium discharged from the condenser before entering the refrigerator. Since the medium, after being raised its temperature, is recirculated to the refuse incinerator, calorific power required for subsequent steam generation can be reduced.

There may be provided a cooling water reservoir for storing the cooling water which circulates between the refrigerator and the condenser. The cold water produced in the refrigerator can be stored temporarily and recovered on demand.

A portion of the cooling water produced in the refrigerator can be arranged to recirculate between a load and the refrigerator. The load may include cold source to serve a demand within the refuse power generation plant system or outside the system.

At least a portion of the foregoing medium may be arranged, after it has been supplied to the refrigerator, to be circulated to the refuse incinerator further via a load.

Further, it is possible to supply a cold water produced in the refrigerator to a customer as a cold source for air-conditioning controlling the amount of supply of the cold water with time.

In the case of supplying of heat to the refrigerator, the heat of the exhaust gas from the refuse incinerator may as well be supplied as a hot water produced by heat exchange.

Next, there has been contemplated an operating method according to the invention for operating a Rankine cycle power generation system which includes the steps of producing heat in a boiler, obtaining a vapor (steam) of a medium which is introduced into the boiler, operating a steam turbine coupled to an electrical power generator to produce electricity, condensing the vapor (steam) of the medium discharged from the steam turbine to obtain a condensate which is recirculated to the boiler, and using a cooling water produced in a refrigerator for condensing the vapor of the medium, wherein the boiler is a refuse incinerator, and wherein a portion of the vapor of the medium produced in the boiler is used to drive the steam turbine to generate electricity, and another portion or the rest of the medium vapor is used to obtain a cooling water or a cold source for obtaining the cold water. Further, a day is divided into at least two time zones of a first time zone and a second time zone, and a power generation in the second time zone is reduced compared to in the first time zone, however, an amount of cold water or cold source therefor is increased in the second time zone instead thereof, and the cooling water or cold source obtained in the second time zone and stored is used in the first time zone.

By way of example, preparation of the cold source may be understood to be equivalent to obtaining a strong absorption solution by heating and concentrating a weak absorption solution and/or to separate refrigerant in the case of the absorption refrigeration. In the case of the compression refrigeration, it is meant to obtain a compressed refrigerant, for example.

For example, the foregoing first time zone may be assigned to a particular time zone of the day during which a unit price of electricity is high, and the second time zone to a time zone during which a unit price of electricity is low. The cooling water or cold source for producing cooling water which has been obtained during the second time zone is utilized for the condenser in the first time zone, thereby, in the first time zone, a quantity of heat necessary for obtaining the cooling water or cold source in the refrigerator can be reduced, thereby more portion of the medium vapor produced in the boiler can be supplied to the steam turbine to achieve a high-efficiency power generation.

Further, heat generated in the refuse incinerator is collected as steam, a predetermined amount of which steam is used to drive the steam turbine to generate electricity, and surplus steam in addition to the predetermined amount of which steam is used to operate the refrigerator to obtain the cooling water or cold source therefor.

According to the invention, heat from refuse incineration has been utilized fully and most effectively even under existence of fluctuation in calorific values due to incineration of refuse and waste. Further, this operating method of this embodiment of the invention is used in conjunction with the aforementioned operating method of the preceding embodiment which changes operating conditions by the time zone of the day so as to ensure more efficient operation.

The refrigerator or refrigeration facility according to the invention is preferably such one that produces a cold water having a temperature in a range from 0° to 20° C. The range of temperature may also include 10°–20° C. or 15°–20° C. Thereby, turbine exhaust temperature and pressure according to the invention can be reduced lower than the conventional exhaust temperatures and pressures. There are provided so-called heat storage facilities which may include, for example, cold water storage, or cold storage unit which may include a reservoir for a cold source for producing cooling water; in the case of an absorption refrigerator, storage units for a strong absorption solution and a refrigerant, in particular, for a strong solution, or for a concentrated refrigerant. Further, it is advantageous to alternately or concurrently carry out a most efficient power generation mode utilizing equipment dedicated to electricity generation by supplying most of the vapor of medium produced to the turbine to generate electricity with assistance of heat dissipation action of cold water stored in the reservoir of the heat storage facility (i.e., through enhanced cooling of the steam turbine exhaust gas in the condenser), and a most efficient heat storage operation mode for storing heat in the heat storage facility, for example, by supplying most of the vapor of the medium to drive the refrigerator, so that production of electricity may be changed at discretion, thereby, the refuse incineration exhaust heat power generation plant can perform a high efficiency operation.

As the foregoing refrigerator, an absorption type refrigerator (absorption type heat engine) can be applied. Depending on a system structure, a compression refrigerator may also be applied.

As a mode of operation to drive equipment using refuse incineration exhaust heat, there are such modes of operation: exhaust gas driving (for example, absorption type); steam driving (for example, absorption, compression types); hot water driving (for example, absorption type); and the like.

The foregoing process of supplying the medium vapor to drive the refrigerator is to operate the refrigerator, for example, by applying heat to an absorption refrigerator to concentrate a weak absorption solution to obtain a strong absorption solution, and/or to produce a cooling water (cold water) through use of the preceding process. It may also include such a process to use the vapor of the medium to drive a refrigerant compressor installed in the compression refrigerator.

With reference to FIG. 9, a schematic diagram of an absorption refrigerator suitable for implementing the invention is illustrated. Refrigerator 5 is comprised of evaporator 73 for evaporating a refrigerant which may be water, concentration vessel 54 for concentrating an absorption solution which may be a LiBr solution, for example, absorption chamber 55 in which vapor of the refrigerant solution is absorbed, and condenser 56 for condensing a vapor of the refrigerant solution generated when the absorption solution is condensed, and wherein the absorption chamber 55 and the condenser 56 are arranged to be cooled by heat exchanger unit 50 through which heat is exchanged with external air.

After non-condensing gas has been purged out of the system, a driving steam (for heating) is admitted through line 120 into absorption solution heating piping of heat exchanger 52 inside condenser 54, and a weak absorption solution flowing through line 550 into the condenser is dispersed to contact with the absorption solution heating piping therein thereby to be heated. The vapor of the solution evaporated by heating therein is directed through line 521 into condenser 56 to be condensed by means of air heat exchanger 50 (air blower is not shown in the drawing).

An amount of the vapor generated corresponds to a concentrated portion of the absorption solution. A strong absorption solution concentrated through the foregoing action is directed through line 540 into absorption chamber 55 to be dispersed therein. Further, the strong absorption solution being dispersed inside the absorption chamber 55, since it is cooled by the air heat exchanger 50 as described above, is in a state of a low vapor pressure, thereby the pressure inside the absorption chamber 55 has a low value. Since the absorption chamber 55 and evaporator 73 are communicative with each other coupled by pipeline 531, the low pressure described above propagates to the evaporator 73. Thereby, a refrigerant liquid flowing through pipeline 560 into the evaporator 73 to be dispersed therein and to contact with the outer surface of cooling water generating heat exchanger 51 in the evaporator 73 is caused to evaporate at a low temperature, and a vapor generated in this manner is admitted through pipeline 531 to the absorption chamber 55 to be absorbed into the strong absorption solution. Further, there is provided absorption solution reservoir 53. The absorption solution reservoir 53 includes absorption solution vessel 71 for storing a concentrated strong absorption liquid and refrigerant liquid vessel 72 for storing a condensed refrigerant liquid.

The refrigerant liquid in contact with the outer surface of the cooling water generating heat exchanger 51 and evaporating at a low temperature receives heat from cooling water 511 which has cooled the condenser and is flowing through piping of the cooling water generating heat exchanger 51. In other word, cooling water 511 having cooled the condenser and is flowing through piping of the cooling water generation heat exchanger 51 is caused to drop its temperature by dissipating its heat and flow to the condenser through pipeline 510.

Through the process of operation described above driven by the steam supplied from pipeline 120, cold water is supplied in turn through pipeline 510.

According to the invention, since a continuous operation is possible throughout night-and-day, and it is possible to supply steam for more effective use for generating a value-added electricity (i.e., at a higher sales price), a Rankine cycle power generation system with an improved Rankine cycle efficiency can be provided. More specifically, since it is possible to adapt to fluctuation in the calorific values due to refuse combustion in the refuse incinerator, and operate night-and-day to supply steam more advantageously to generate electricity which can be sold with an added value (at a higher unit price), there is provided a Rankine cycle power generation plant which can be very economical having an improved Rankine cycle efficiency. The specific particulars thereof will be described in the following.

According to the invention it has become possible significantly to drop the exhaust temperature of the exhaust vapor of the steam turbine (pressure is caused to drop as well naturally) compared to the exhaust temperature in the conventional method since the exhaust vapor of the steam turbine can be effectively condensed through cooling by the cooling water (cold water) which is supplied through operation of the steam-driven refrigerator, thereby, a heat drop for the vapor in the steam turbine cycle can be maximized in consequence, thereby increasing a unit production of electricity per unit steam volume, or in other word, per unit volume of refuse even at relatively low steam temperatures (or heat temperature) obtainable from the refuse incinerator.

Further, since the refrigerator is driven by surplus heat energy produced in the plant itself, there is no additional cost for energy, thereby an increase in the operational cost can be suppressed substantially.

Still further, it becomes possible according to the invention, while maintaining a stable and continuous operation of refuse incineration task, to change at discretion or stop generation of electricity on demand. That is, when it is opted to sell electricity from the refuse power generation plant to the utility company, there are such advantages that in a time zone when a unit price of electricity is higher (hereinafter, referred to as a unit sales price of electricity on the side of supplier of electricity, and a unit purchase price of electricity on the side of consumer), the high efficiency full-scale power generation operation described above (for example, to maximize the generation of electricity) is carried out devotedly, and that in a time zone when the unit sales price of electricity is low, generation of electricity is substantially suppressed or stopped in turn to supply heat as well as cold from the refuse power generation plant to serve a demand inside and outside the refuse incineration facilities, thereby improving a profit of selling electricity or heat source advantageously.

Further, through effective operation of the foregoing operational methods of the invention, the refuse incineration operation can be properly continued without difficulty even when any of the facilities pertaining to power generation such as the steam turbine, generator, condenser and the like is interrupted of its operation.

BRIEF DESCRIPTION OF THE DRAWINGS

The invention disclosed herein will be understood better with reference to the following drawings of which.

[Descriptions of the Numerals]

1 . . . refuse incinerator, 2 . . . steam turbine, 3 . . . generator, 4 . . . condenser, 5,5a,5b,5c,7 . . . refrigerator, 6 . . . heat drop/decompressor, 8a . . . heat storage, 11 . . . exhaust heat recovery heat exchanger, 12 . . . hot water producing heat exchanger, 41...cooling pipe, 50,70...air heat exchanger, 51,71 . . . cold water producing heat exchanger, 52 . . . absorption solution heating heat exchanger, 52b,52c. . . absorption solution heater, 53 . . . absorption solution reservoir vessel, 100 . . . refuse and waste, 110,112,120,210 . . . steam line, 121 . . . exhaust gas line, 130,133,410,520 . . . condensate line, 131,132 . . . hot water line, 310 . . . electricity power transmission system, 510,511 . . . cooling water line, 512,513,810,811 . . . cooling water line, 610 . . . water filling line.

EMBODIMENTS

Preferred embodiments of the invention will now be described in detail with reference to the accompanying drawings in the following.

Figure 1:
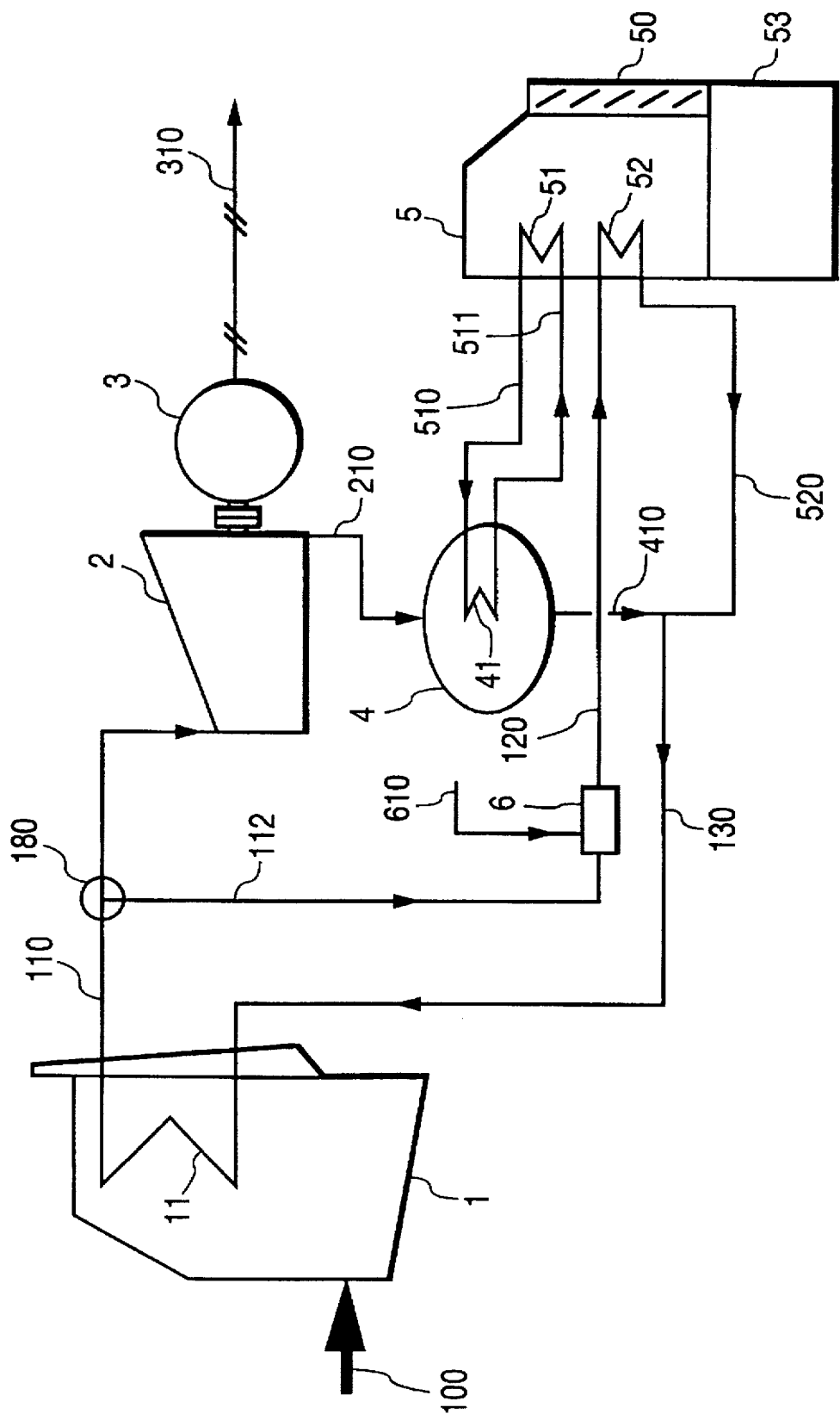
FIG. 1 is a schematic diagram indicative of a basic arrangement and piping of a first embodiment of the invention.

With reference to FIG. 1, there is indicated a schematic arrangement and piping thereof according to a first embodiment of the invention. Main components which constitute the system of the first embodiment include refuse incinerator 1, steam turbine 2, generator 3, condenser 4, and refrigerator 5 provided with absorption solution storage vessel 53 (the refrigerator may be an absorption refrigerator or heat storage absorption refrigerator).

Refuse is input into refuse incinerator 1 to be incinerated therein (other facilities associated with the incinerator is not shown in the drawing). Combustion exhaust gas obtained therein is used to heat a medium (hereinafter referred to as water since in most cases the medium is water) flowing through the heat transfer piping of exhaust heat recovery heat exchanger 11 so as to generate steam (vapor) thereof. The steam is superheated into a superheated steam in a superheater (not shown) of the heat exchanger 11, and supplied through steam line 110 to steam turbine 2 to drive the same. Drive torque thus obtained is used to drive generator 3 coupled to the turbine 2 thereby to generate electric power. The electric power thus generated is supplied to the user or sold to the commercial electric power system through electric transmission line 310.

Steam expanded in the steam turbine 2 is directed to water cooled condenser 4 (hereinafter referred to as a condenser) through steam line 210. The condenser 4 is provided with cooling piping 41. Through the cooling piping 41 there flows cold water which is produced in refrigerator 5 and supplied as a cooling water through cooling water line 510. Thereby, the steam flowing through the steam line 210 into the condenser is caused to condense upon contact with the heat transfer piping 41. Non-condensing gas is purged out of the condenser 4 in advance (related purging equipment is not shown) and purging of the non-condensing gas is continued during operation, thereby a pressure inside the condenser 4 is maintained at a saturation pressure corresponding to the condensing temperature of steam therein.

Condensate from the turbine exhaust steam which has been condensed in the condenser 4 is recirculated to the exhaust heat recovery heat exchanger 11 through condensate lines 410 and 130 to become steam once again (other facilities, descriptions thereof and drawings associated with the boiler feedwater system are omitted).

The cooling water which has been subjected to condensate heat of the turbine exhaust steam and increased its temperature is returned through cooling water line 511 to cold water producing heat exchanger 51 in the refrigerator 5. The foregoing refrigerator 5 is an absorption heat engine (hereinafter referred to as an absorption refrigerator or simply as a refrigerator). According to the principles of operation of the foregoing absorption refrigerator, heat having been collected in the condenser and dissipated from the surface of the heat exchanger 51, is further dissipated through action of the absorption liquid through air heat exchanger 50 to ambient having a higher temperature than the temperature of the cooling water flowing the lines 511 and 510.

The above-mentioned mode of operation is provided by a dilution cycle of the absorption solution, thereby an additional process for concentrating the absorption solution is also required. A concentration cycle for concentrating the absorption solution will be described in the following.

The steam produced from the refuse incineration exhaust heat is directed through steam line 110 and flow control mechanism 180 to heat reducer/depressurizing unit 6 (hereinafter referred to as a heat reducer), in which its temperature is adjusted by injecting water from water injector system 610 of the heat reducer 6, then the steam is directed through steam line 120 to absorption solution heating heat exchanger 52 in the absorption refrigerator 5, to concentrate by heating a weak absorption solution diluted as described above. Then, a strong absorption solution concentrated as above is supplied for use in the dilution cycle as described above.

The steam which worked to heat the absorption liquid in the heating heat exchanger 52 and became a condensate is directed through condensate lines 520 and 130 into the exhaust heat recovery heat exchanger 11 in the refuse incinerator 1 to become steam once again.

The basic configuration of the refuse incineration exhaust heat power generation system and one example of its operation according to the invention have been described hereinabove. Now, advantages of the present invention will be described quantitatively in comparison with a conventional refuse incineration power generation plant presently in operation with reference to Table 1 in the following.

TABLE 1

| ITEM | | | CONVENTIONAL | INVENTION |
|---|---|---|---|---|
| INLET | TEMPERATURE | °C. | 250 | 250 |
| | PRESSURE | kg/cm² | 17.5 | 17..5 |
| | ENTHALPY | kcal/kg | 696 | 696 |
| OUTLET | TEMPERATURE | °C. | 69 | 20 |
| | PRESSURE | kg/cm² | 0.304 | 0.024 |
| | ENTHALPY | kcal/kg | 533 | 467 |
| WORK LOAD | | kcal/kg | 163 | 229 |
| ELECTRICITY GENERATED/STEAM CONSUMED | | kW.h/kg | 0.190 | 0.266 |

Steam conditions at the inlet of the steam turbine for the steam generated using the refuse incineration exhaust heat have and inlet temperature of 250° C. and an inlet pressure of 17.5 kg/cm² (1,716 MPa). Steam conditions at the outlet of the steam turbine of a conventional type using an air cooled condenser have an exhaust temperature of 69° C., and an outlet pressure of 0.304 kg/cm² (0.030 MPa). In contrast, according to the invention, since the condenser 4 is cooled with cold water produced in the refrigerator 5 as indicated in FIG. 1, its steam conditions at the outlet of the steam turbine 2 are improved significantly compared to the conventional type such that its exhaust temperature and outlet pressure became 20° C. and 0.024 kg/cm² (0.024 MPa), respectively.

The inlet steam condition at the entrance of the steam turbine 2 is the same for both the conventional type and the present invention in terms of enthalpy, that is, 696 kcal/kg (2914 kJ/kg). On the other hand, while the exhaust steam condition at the outlet of the steam turbine 2 in terms of enthalpy is 533 kcal/kg (2232 kJ/kg) for the conventional type, it is 467 kcal/kg (1955 kJ/kg) according to the invention, which value is substantially lower than that of the former. Thereby, in terms of work calculated as a difference between the steam turbine inlet enthalpy and the steam turbine outlet enthalpy (disregarding losses within the turbine), while the conventional type achieves 163 kcal/kg (682 kJ/kg), the present invention achieves 229 kcal/kg (959 kJ/kg). Further, assuming the efficiency of the generator 3 to be 100%, a unit generation of electricity per 1 kg of steam produced from the refuse incineration exhaust heat is 0.266 kW-h according to the invention whereas it is 0.190 kW-h according to the conventional type. That is, an improvement in the generation of electricity of approximately 40% can be achieved according to the invention.

Figure 2:
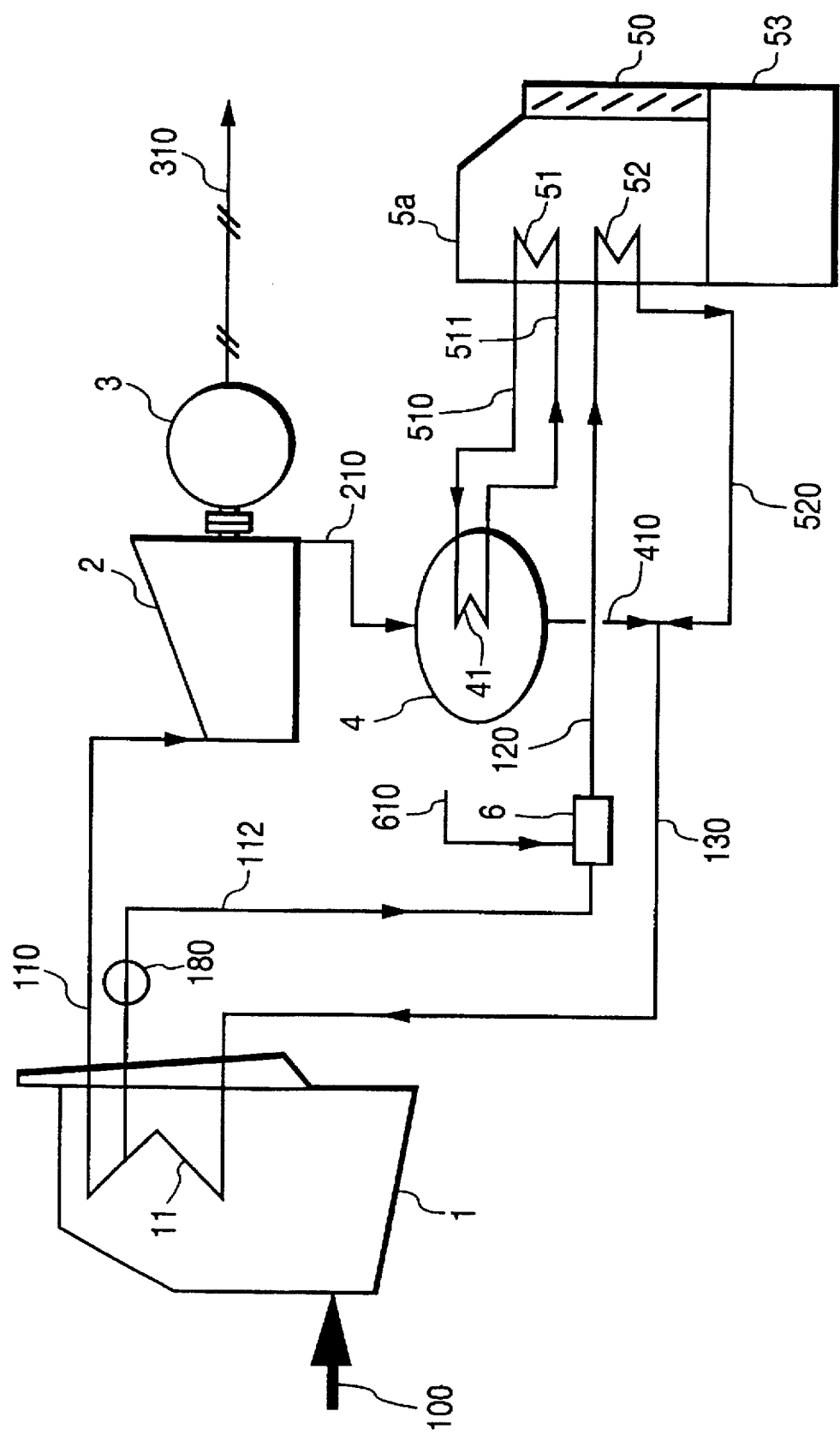
FIG. 2 is a schematic diagram indicative of another embodiment of the invention.

With reference to FIG. 2, another embodiment of the invention will be described.

The basic structure of the another embodiment is comprised of refuse incinerator 1, steam turbine 2, generator 3, condenser 4 and heat storage type refrigerator 5a provided with absorption liquid storage vessel 53.

Likewise as in the drawing of FIG. 1, refuse 100 is delivered to the refuse incinerator 1 to be combusted therein, and exhaust gas from its combustion is utilized to heat water flowing through piping of exhaust heat recovery heat exchanger 11 to generate steam. Respective electric power generation plants in FIGS. 1 and 2 can be switched of their operation in accordance with a preferred mode of operation in order to serve a particular use object of the generated steam and its specific steam condition which is defined advantageously depending on a unit sales price of electricity at a particular time zone which will be described later.

The unit sales price of electricity to be sold from this refuse power generation plant to the commercial power transmission system, or a purchase unit price of electricity from the viewpoint of the electric power supply industries, is divided according to a weekday or holiday, and daytime or night-time, and a unit price during daytime of a weekday is set substantially higher than that on a holiday and during night-time.

In other word, the value of refuse 100 being put into the refuse incinerator of the refuse power generation plant of the invention throughout the night and day changes high during day time of a weekday and low during on a holiday or during night hours.

Thereby, according to this embodiment of the invention whereby the refuse incineration task is continued day and night, it can be arranged such that during a day time zone of a weekday when the unit price of electricity is high, a high efficiency full-scale generation of electricity is adopted to increase sales of electricity, and during night hours when the unit price of electricity is low, generation of electricity is minimized or stopped so as to be able to supply most of the steam produced in the refuse incinerator during this time zone to the refrigerator 5 or 5a as a heat source to concentrate the weak absorption solution thereof or the like. Further, on a holiday, it is arranged throughout a whole day, for example, such that a portion of the steam generated in the refuse incinerator 1 is supplied for generation of electricity and the remaining portion thereof is utilized for concentration of the absorption solution.

With reference to FIG. 2, during the daytime zone of a weekday it is arranged likewise FIG. 1 such that the steam generated in the exhaust heat recovery heat exchanger 11 in the refuse incinerator 1 is further heated in a superheating heat transfer piping of the heat exchanger 11 to become a superheated steam which is directed through steam line 110 to steam turbine 2 to drive the turbine, then exhaust steam from the turbine is directed to condenser 4 where it is condensed to a condensate which is recirculated through condensate lines 410, 130 into the exhaust heat recovery heat exchanger 11 in the refuse incinerator 1. Flow control device 180 is provided, not at a branch of the heat exchanger, but apart in the vicinity thereof.

In the drawings of FIGS. 1 and 2, as cooling water for cooling the condenser 4, cold water produced in refrigerator 5 or 5a is supplied through cooling water line 510. The foregoing cold water is produced through a heat dissipation mode operation of the refrigerator 5 or 5a, where the heat dissipation mode which will be described later denotes a cold water production mode to produce cold water through act of a strong absorption liquid which has been concentrated by a heat storage mode operation during night hours and through heat dissipation by air cooled heat exchanger 50.

Generator 3 is driven by torque of the turbine to generate electricity, and the electricity generated under a high efficiency full-scale power generation operational condition is transmitted through power transmission line 310 to the commercial power transmission system for sale.

On the other hand, during night hours of a weekday, a heat storage operation as will be described later is performed. Steam generated in the piping of exhaust heat recovery heat exchanger 11 in the refuse incinerator 1 is directed to temperature reducer 6 through steam line 112 where its temperature and pressure are adjusted, then the adjusted steam is supplied to absorption solution heating heat exchanger 52 in refrigerator 5 or 5a.

During this time zone, related lines and subsystems in the refrigerator 5 or 5a are in a heat storage mode which is a process to concentrate a weak absorption solution, thereby the weak absorption solution in absorption solution vessel 53 is concentrated due to a difference of temperatures between a heating temperature at the absorption solution heating heat exchanger 52 and a cooling temperature at air heat exchanger 50, then a strong absorption liquid concentrated above is stored in the absorption liquid storage vessel 53.

Further, on holidays, the foregoing generation of electricity and the concentration of absorption solution are performed in parallel throughout a whole day, which will be described in detail in the following.

Firstly, with respect to the operation for generation of electricity, a portion of the steam generated in the piping of the exhaust heat recovery heat exchanger 11 in the refuse incinerator 1 is superheated in a superheater piping of the heat exchanger 11 to provide superheated steam which is directed through steam pipeline 110 to steam turbine 2 to drive the turbine. Exhaust steam therefrom is directed to condenser 4 and condensed therein to a condensate which is recirculated through condensate pipelines 410 and 130 to the exhaust heat recovery heat exchanger 11 in the refuse incinerator 1.

As cooling water for cooling the condenser 4 there is supplied cold water which is produced in the refrigerator 5 or 5a described above through piping 510. The foregoing cold water is produced in the aforementioned refrigerator 5 or heat storage absorption refrigerator 5a, more particularly, it is produced by subjecting to cooling a strong absorption liquid which has been concentrated by a heating process which will be described later in air heat exchanger 50. Likewise the preceding example, turbine torque drives the generator 3 to generate electricity which will be transmitted through electrical transmission system 310 for sale.

A process for concentrating a weak absorption solution, which is performed in parallel with the process for generator of electricity, will be detailed in the following. That is, a branched portion of steam generated in the piping of the exhaust heat recovery heat exchanger 11 in the refuse incinerator 1 is directed through steam pipeline 112 to temperature reducer 6 in which its temperature and pressure are adjusted, then the adjusted steam is supplied as a heating steam through steam pipeline 120 to absorption solution heating heat exchanger 52 in the refrigerator 5 or 5a. A weak absorption solution circulating within a main body of the refrigerator 5 or 5a (or a weak absorption solution in absorption solution storage vessel 53 may also be admitted into the main body of the refrigerator 5 or the heat storage absorption refrigerator 5a) is concentrated into a strong absorption liquid due to a difference of temperatures available between the heating steam temperature at the absorption solution heating heat exchanger 52 and the cooling temperature at the air heat exchanger 50. Through this refrigeration cycle a cold water is produced to be supplied to the aforementioned efficient power generation operation.

As has been described above, on holidays, the steam generated in the exhaust heat recovery heat exchanger 11 in the refuse incinerator 1 is divided into portions for use for driving the steam turbine 2 as well as for driving the refrigerator 5 or 5a, thereby sales of electricity through power transmission line 310 can be continued throughout the whole day.

Further, since operational conditions for the exhaust heat recovery heat exchanger 11 in the refuse incinerator 1 can be modified at discretion, if a steam condition suitable for a particular steam requirement at the heating heat exchanger 52 can be provided, the aforementioned temperature reducer 6 can be eliminated.

Various advantages and results to be achieved through implementation of the mechanical structure, system and operating method of the system according to the present invention are summarized in Table 2 and will be detailed in the following.

is generated in daytime-of-a-weekday zone and 0.431 kW of electricity is generated in the other time zone on a holiday.

Conventionally, in terms of annual operable hours for each time zone, average operable hours corresponding to the holiday-daytime zone are 300 days×14 hours=4200 hours, and average operable hours corresponding to the other time zone are (300 days×10 hours)+(59 days×24 hours)=4416 hours. From these estimates and in consideration of each unit sales price for each time zone, it is calculated that annual sales profit for the weekday-daytime zone is under a high efficiency power generation operational condition ¥28, 665 and the annual sales profit for the other time zone is ¥10,127, thereby adding up to ¥38,792 in total.

On the other hand, according to the invention, annual operable hours for each time zone are estimated as follows. Operable hours corresponding to the weekday-daytime zone are 4200 hours which are the same as in the conventional example, and operable hours corresponding to the other time zone on holidays are 59 days×24 hours=1416 hours. That is, even thought we do not count 3000 hours (300 days×10 hours) for the weekday-night hour zone contribute to the

TABLE 2

| ITEM | CONVENTIONAL | | | PRESENT INVENTION | | |
| --- | --- | --- | --- | --- | --- | --- |
| | WEEKDAY & DAYTIME | OTHER TIME ZONE | TOTAL | WEEKDAY & DAYTIME | OTHER TIME ZONE | TOTAL |
| ELECTRIC GENERATION AMOUNT OF REFUSE DISPOSED (Kwh/kg) | 0.546 | 0.546 | | 0.709 | 0.431 | |
| ANNUAL OPERATING DAYS (days/year) | 300 | 59 | 359 | 300 | 59 | 359 |
| ANNUAL OPERATING HOURS (h/year) | 4200 | 4416 | 8616 | 4200 | 1416 | 5616 |
| ANNUAL GENERATION OF ELECTRICITY (kWh/year) | 2293 | 2411 | | 2978 | 610 | |
| UNIT SALES PRICE (yen/kWh) | 12.5 | 4.2 | | 12.5 | 4.2 | |
| ANNUAL SALES PROFIT (yen/year) | ¥28,665 | ¥10,127 | ¥38,792 | ¥37,223 | ¥2,563 | ¥39,786 |

Data in Table 2 are calculated on the basis of a reference value of an input of refuse 100 into the refuse incinerator to be 1 kg/h and according to the following conditions.

Working days and stoppage days per year of the refuse incineration power generation plant are assumed to be 359 days and 6 days, respectively. Further, working days corresponding to the daytime zone of a weekday during which a unit purchase price for the electrical utility company to buy electricity from the refuse power generation plant is 12.5 yen per kWh are assumed to be 300 days per year, and working days corresponding to time zones on holidays or night hours of a weekday (hereinafter referred to as the other time zone) during which the foregoing unit purchase price of electricity is 4.2 yen per kWh are assumed to be 59 days per year. Day time hours of a day corresponding to the aforementioned daytime zone of a weekday are defined to include 14 hours from 8:00 to 22:00, and night time hours to include 10 hours from 22:00 to 8:00. Further, a calorific value of heat from refuse incineration is assumed to be 1800 kcal/kg.

On the basis of reference values on electricity generated relative to a unit amount of steam indicated in Table 1, when refuse with a calorific value of 1800 kcal/kg is supplied at a ratio of 1 kg/h, electricity of 0.546 kW is generated in each time zone of a daytime of a weekday and of the other time zone as well according to the conventional method, however, according to the invention, 0.709 kW of electricity generation of electricity, annual sales profit from sales of electricity to the electric utility company results in ¥37,223 in the weekday.daytime zone and ¥2,563 in the other time zone, thus adding up to ¥39,786 in total.

That is, through implementation of the invention, annual sales profit from sales of surplus electricity for a unit amount of refuse incinerated at 1 kg/h is increased as much as by ¥994 compared to the conventional case. Thereby, if there is provided a refuse incineration power generation plant which is capable of combusting, for example, 300 tons of refuse and waste per day (=12500 kg/h), an annual profit gain over ¥12,400,000 (¥994×12500 kg/h) will result in.

Further, according to the embodiments as indicated in FIGS. 1 or 2, it is not necessary for the steam volume supplied through steam pipeline 112 to be constant. It can be arranged such that at flow control device 180 a predetermined amount of steam is branched from a total amount of steam generated to the steam turbine, and a surplus steam exceeding the predetermined amount is directed through pipeline 112 to the refrigerator 5 or 5a.

That is, fluctuation in the steam flow remaining in the steam pipeline 112 appears as a fluctuation in a steam volume to be supplied to the absorption solution heater 52 in the refrigerator 5 or 5a, then, the foregoing fluctuation in the steam flow is caused to be absorbed in the absorption solution storage vessel 53.

Thus, it becomes possible for the fluctuation in the amount of steam generated due to calorific variation of refuse 100 to be absorbed constantly in the steam pipeline system 112 according to the invention, and since a constant amount of steam can be supplied to the superheater portion of the exhaust heat recovery heat exchanger 11 and to the steam turbine 2 through the steam pipeline 110, the steam turbine can be operated stably. Thereby, such a loss of steam associated with the conventional method involved in adjusting the fluctuation in the steam generated by constantly discharging surplus volume outside its system can be completely eliminated.

Figure 3:
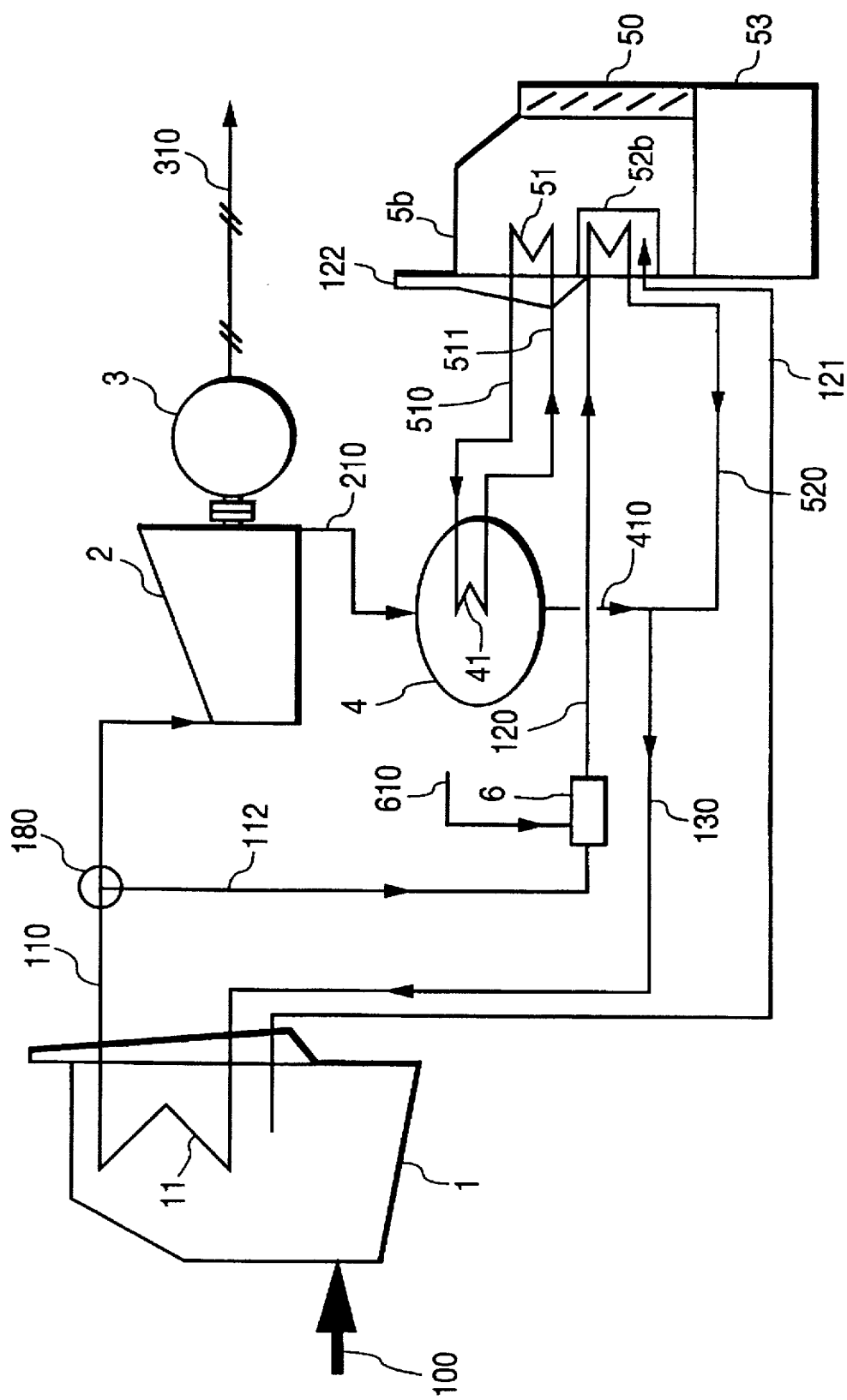
FIG. 3 is a schematic diagram indicative of still another embodiment of the invention.

With reference to FIG. 3, still another embodiment of the invention will be described. Constituent components pertaining to refuse incineration and power generation are the same as in the preceding embodiment, except for refrigerator 5b of this embodiment which is further provided with means for concentrating a weak absorption solution by a hot combustion gas.

According to this embodiment of the invention, exhaust gas from refuse combustion is directed through line 121 to absorption solution heater 52b of refrigerator 5b, then, after heating the absorption solution, the exhaust gas will be discharged through exhaust gas treatment equipment (not shown) and flue gas stack 122 to the atmosphere. Since the weak absorption solution can be concentrated by the aforementioned absorption solution heater 52b through this step, the steam which has been required in the preceding embodiment for the heat storage operation relating to the concentration of the absorption solution is no more required. Thereby, a total amount of steam to be generated by the exhaust heat recovery heat exchanger 11 in the refuse incinerator 1 can be reduced, and as a result, a total surface area required for heat transfer of the heat exchanger 11 can be reduced. That is, a more compact size of equipment and a reduced cost for facilities can be achieved. Although it is not shown in the drawing, exhaust gas flow to the refrigerator can be regulated so as to be able to regulate heat storage operation (concentration of the absorption solution). According to this embodiment of the invention, since it is possible to utilize exhaust gas as a supplementary heat source in the refrigerator when the steam generated in the refuse incinerator 1 is not abundant, or even as a constant heat source therefor, a most efficient stable steam turbine operation can be ensured.

Figure 4:
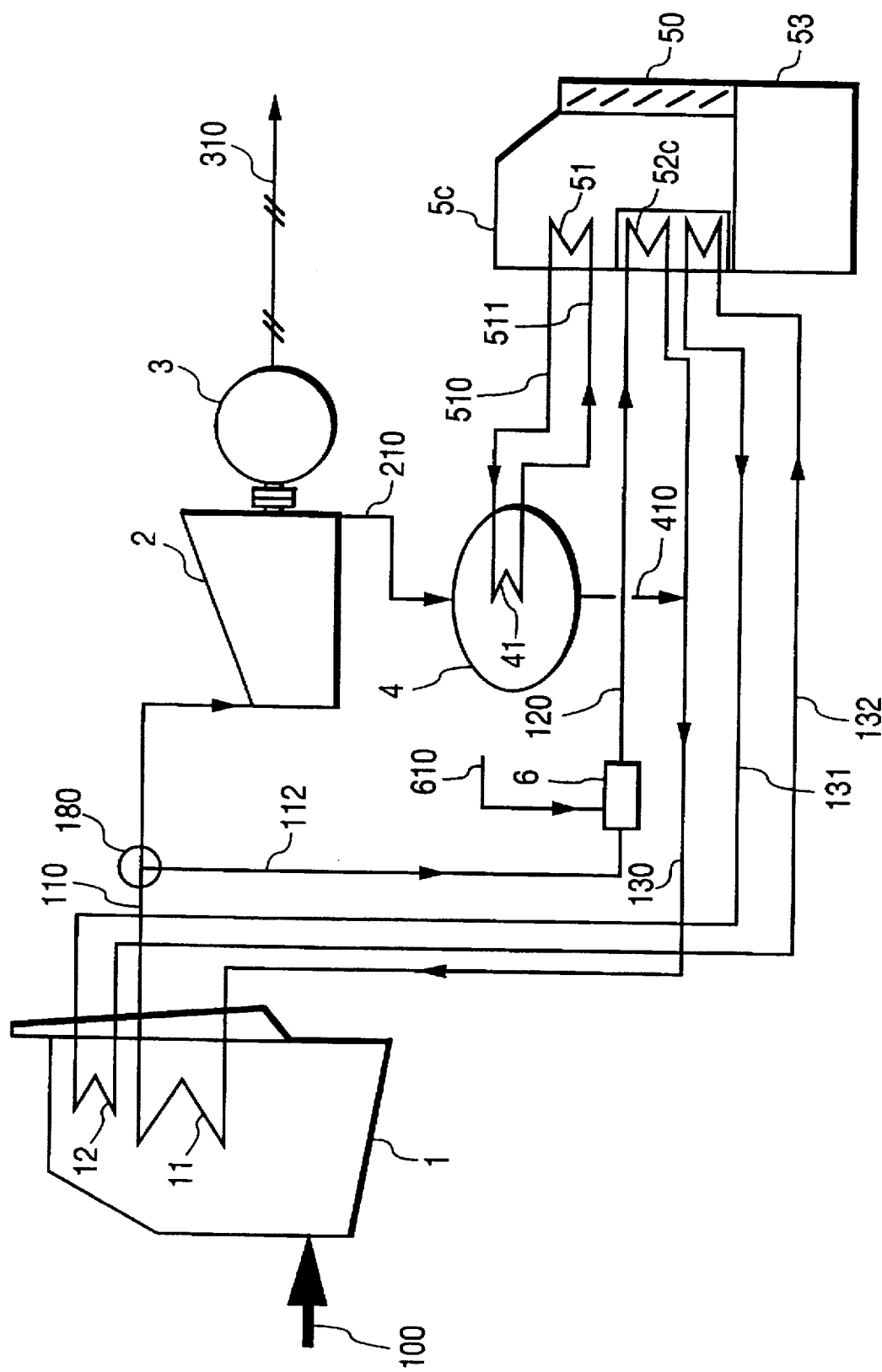
FIG. 4 is a schematic diagram indicative of furthermore embodiment of the invention.

With reference to FIG. 4, furthermore embodiment of the invention will be described. Main constituent components pertaining to the refuse incineration and the power generation are the same as in the preceding embodiments, except for refrigerator 5c in which a weak absorption solution is concentrated using a hot water at approximately 120° C.

According to this embodiment, heat is recovered from refuse incineration exhaust gas through hot water producing heat exchanger 12, and a hot water produced therein is directed through pipeline 131 to absorption solution heater 52c in refrigerator 5c to heat and concentrate a weak absorption solution therein.

Thereby, it becomes possible to regulate at discretion the total volume of steam to be generated in exhaust heat recovery heat exchanger 11 in the refuse incinerator 1 as well as a total amount of hot water to be produced in the hot water producing heat exchanger 12, thereby, various modes of operation including individual operations for generating electricity and heat storage process, or parallel operation therebetween will be executed easily. Since this hot water can be utilized as a supplementary heat source in the refrigerator in case the steam generated in the refuse incinerator is insufficient by itself and cannot be spared, or even as a constant heat source in part therefor, a most efficient and stable steam turbine operation can be ensured.

Figure 5:
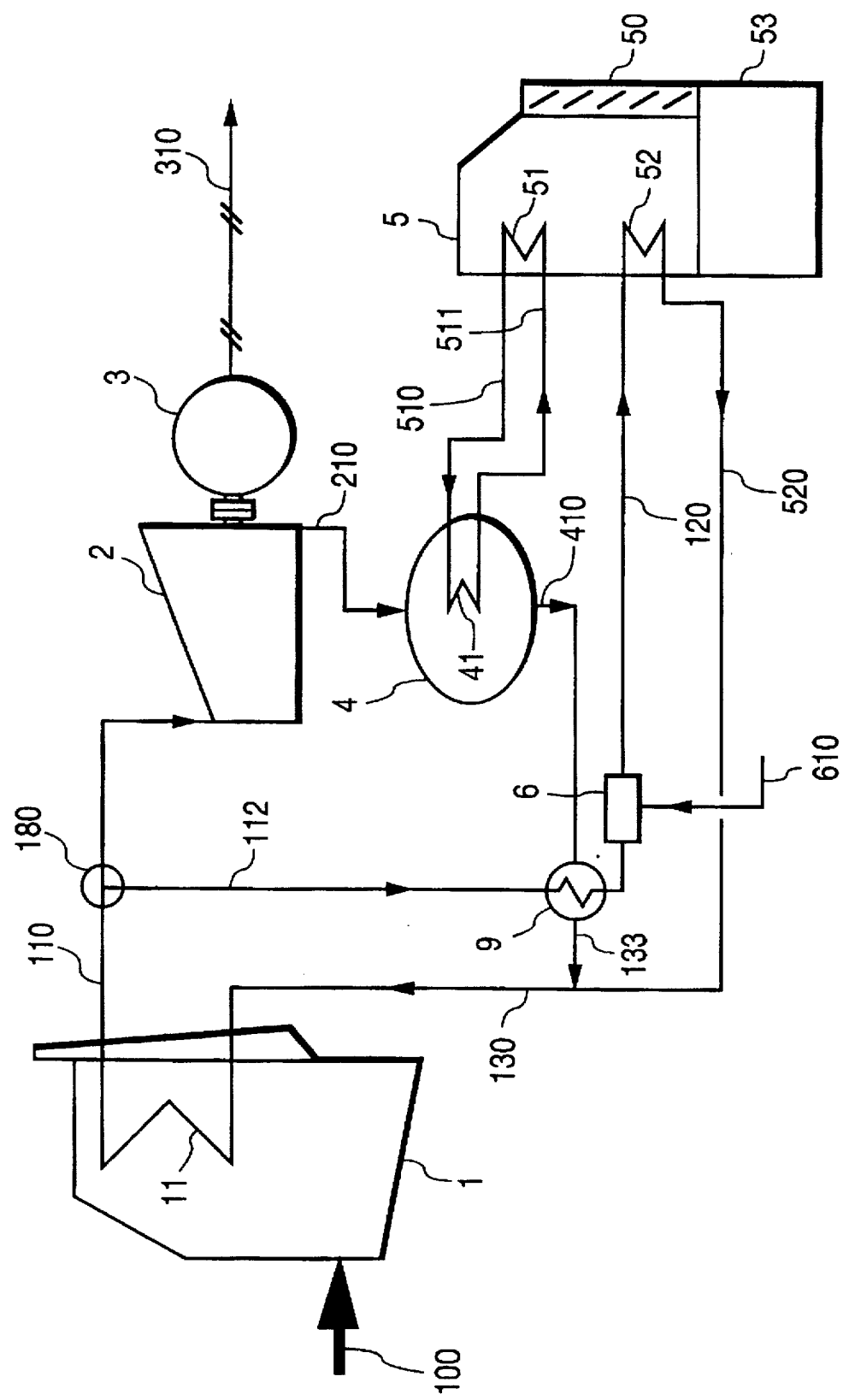
FIG. 5 is a schematic diagram indicative of still another embodiment of the invention.

With reference to FIG. 5, a schematic pipeline diagram indicative of a still another embodiment of the invention will be described. Steam is supplied through steam line 112 into preheater 9 in which the steam exchanges heat with a condensate of steam having a relatively low temperature directed through condensate pipeline 410 from condenser 4. The condensate is heated in the preheater and directed through condensate pipelines 133, 130 to the exhaust heat recovery heat exchanger 11. On the other hand, the steam the calorific value of which is decreased due to heat exchange with the condensate is supplied through steam pipeline 120 to absorption solution heating heat exchanger 52 in refrigerator 5, then after having heated the absorption solution, it is directed through pipelines 520 and 130 to the exhaust heat recovery heat exchanger 11.

As having been described above, by heating the condensate to be returned to the exhaust heat recovery heat exchanger 11 of the refuse incinerator 1 using the steam from the pipeline 112, it is possible to reduce a total calorific value required for steam production, thereby reducing a unit amount of refuse required for a unit electricity generation. That is, a more electricity can be generated from the same amount of refuse according to this embodiment of the invention.

Figure 6:
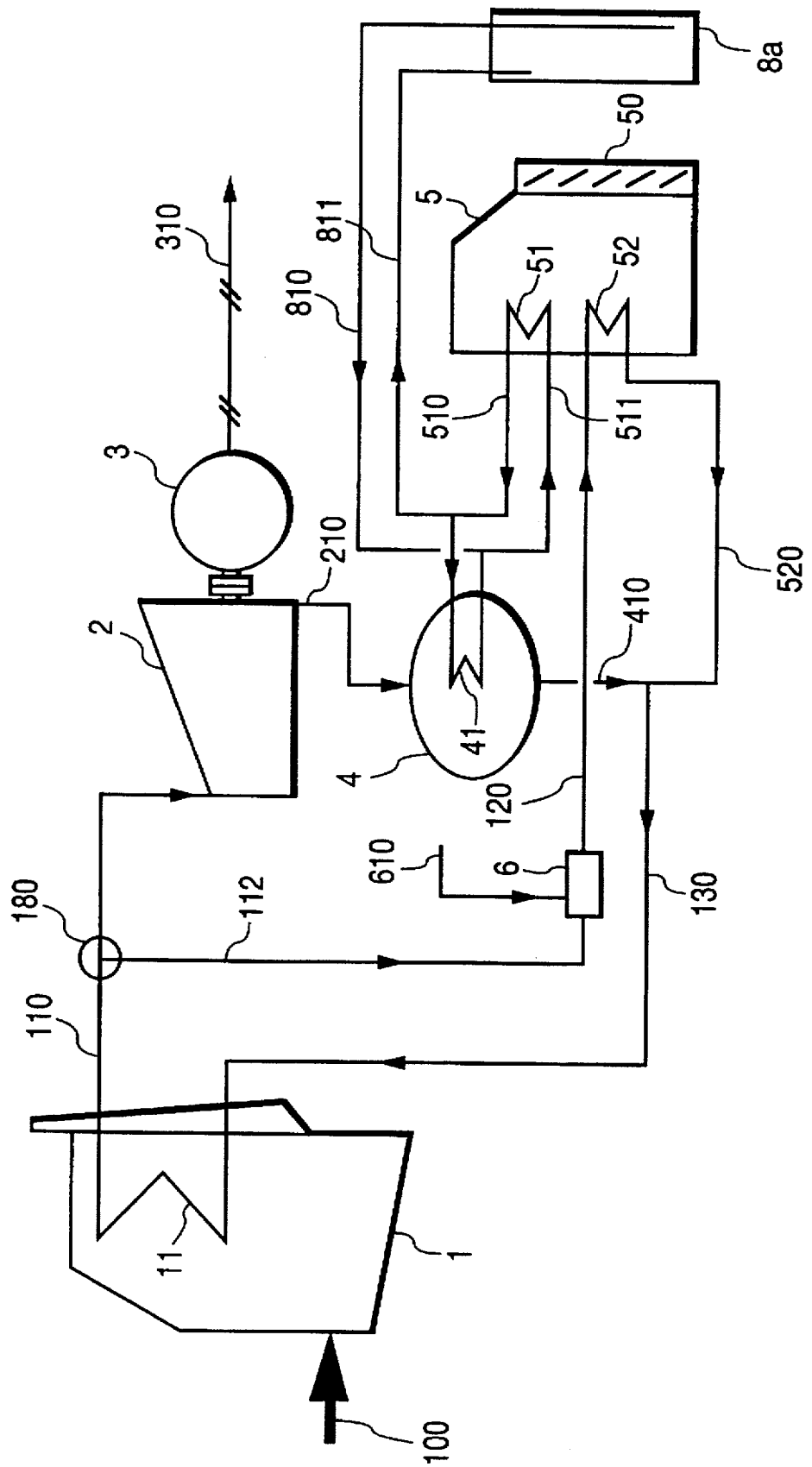
FIG. 6 is a schematic diagram indicative of further embodiment of the invention.

FIG. 6 is a schematic diagram depicting still another embodiment of the invention.

Heat storage vessel 8a is provided for storing a portion of cold water which has been produced in absorption refrigerator 5. The cold water stored in the storage vessel 8a will be recovered on demand and returned through cold water pipelines 810, 811 for use as a cooling water in cooling piping 41 in the condenser 4.

According to this embodiment of the invention indicated in the drawing of FIG. 6, since any type of absorption refrigerator with a conventional design and particulars can be used as the refrigerator 5, and what is stored is water, maintenance of this system is advantageously simple enough.

Figure 7:
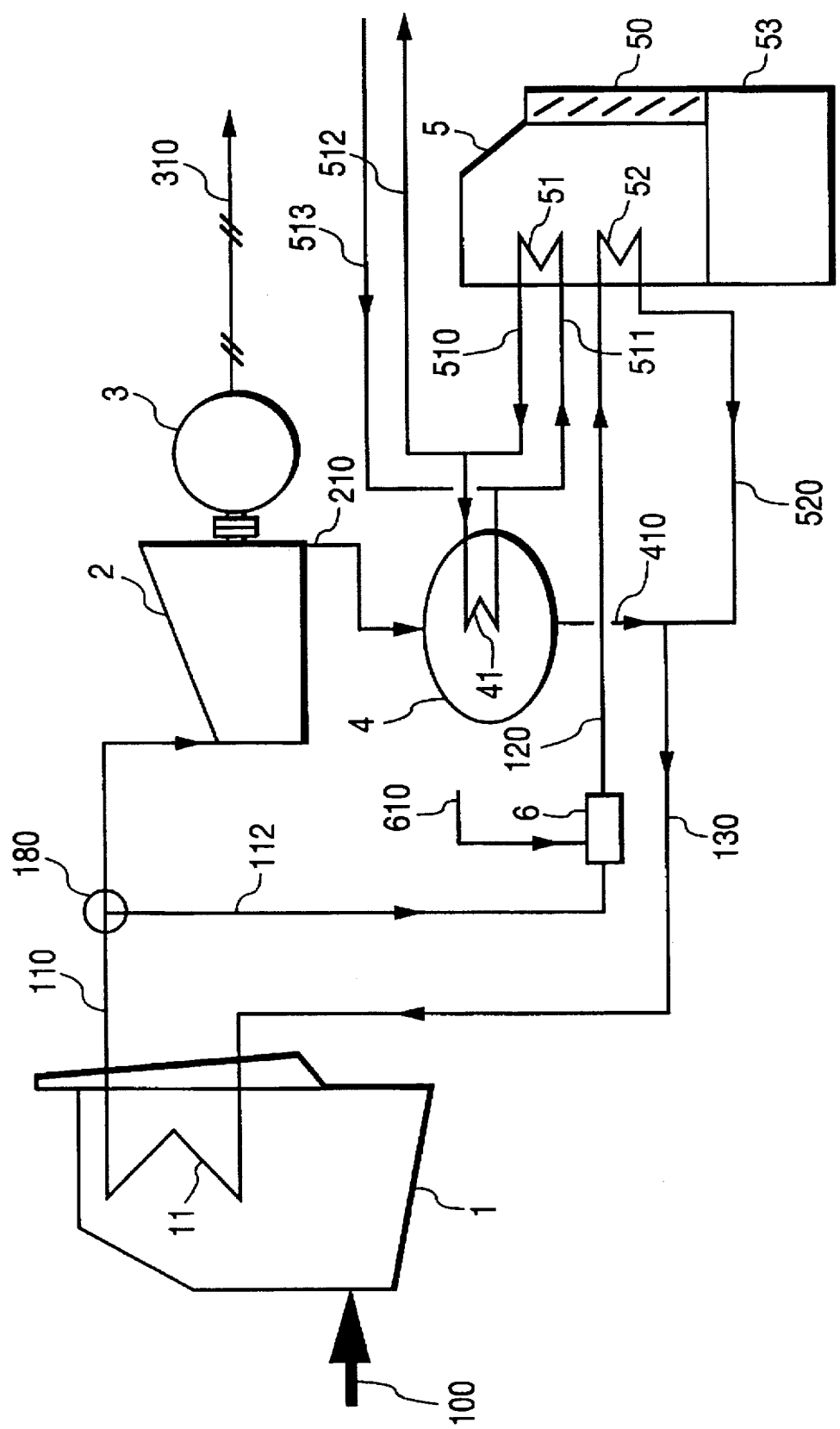
FIG. 7 is a schematic diagram indicative of furthermore embodiment of the invention.

With reference to FIG. 7 a schematic pipeline system of a still further embodiment of the invention is depicted. Cold water produced in refrigerator 5 is supplied through cold water pipeline 512 to facilities within and outside the refuse compound as a cold heat source for use in air-conditioning, and it is returned through cold water pipeline 513 after having done its work and been raised its temperature at customer's facilities. If a destination of the cold heat to be supplied through cold water piping 512 is to a district air-conditioning plant, cold heat production facilities by and large in this district can be reduced substantially, and at the same time consumption of electricity relating to air conditioning in this district can be significantly reduced as well.

Figure 8:
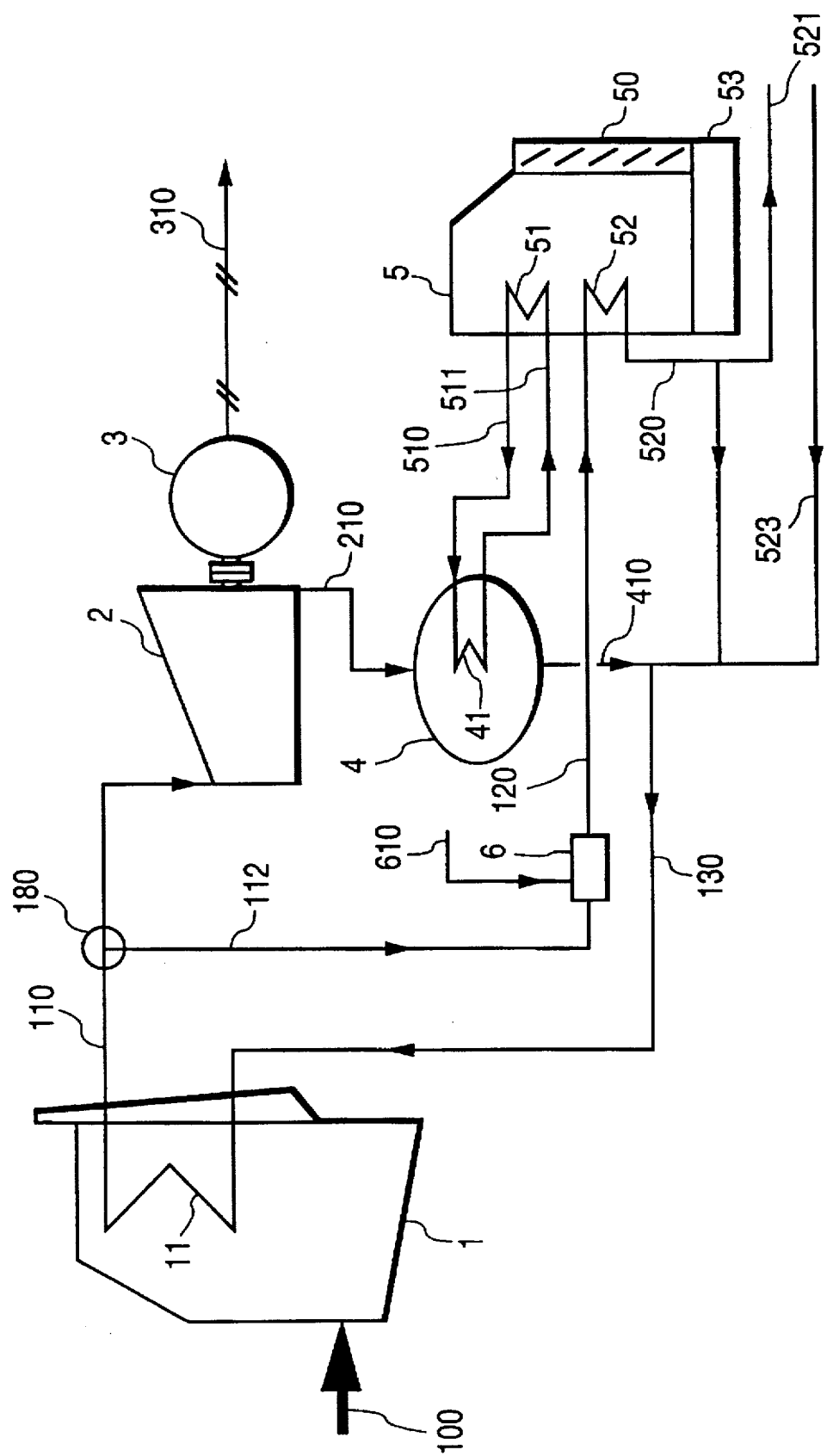
FIG. 8 is a schematic diagram indicative of still further embodiment of the invention.
Figure 9:
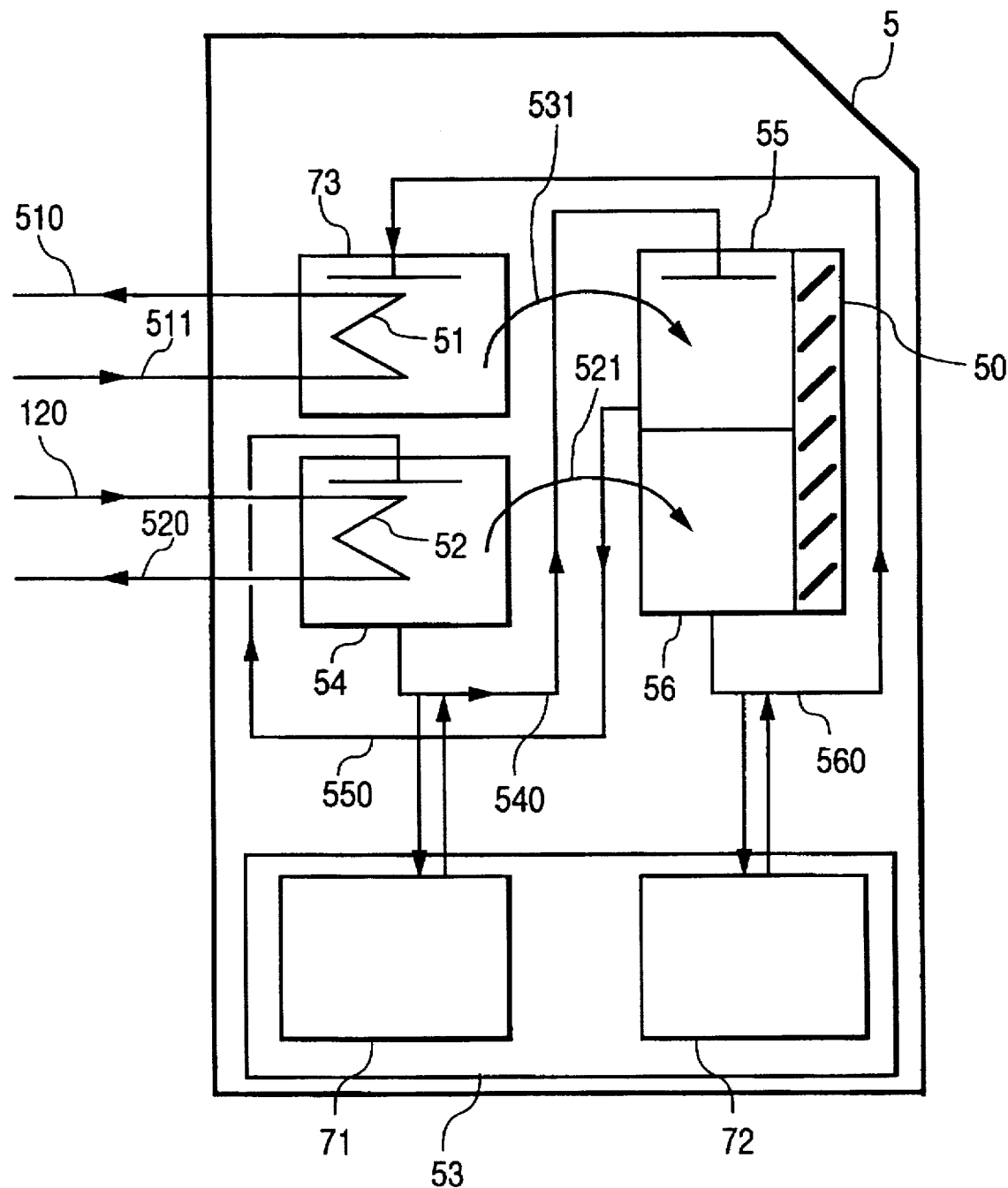
FIG. 9 is a schematic diagram indicative of an arrangement of a refrigerator suitable for implementing the invention.
Figure 10:
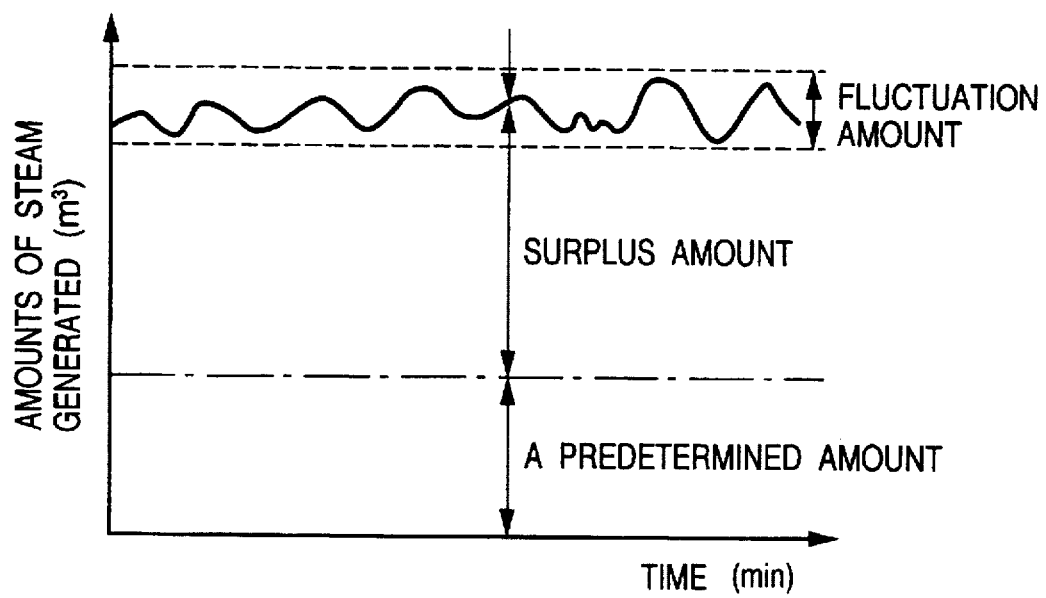
FIG. 10 is a schematic diagram illustrative of a total amount of steam produced in the refuse incinerator and its use according to the invention.
Figure 11:
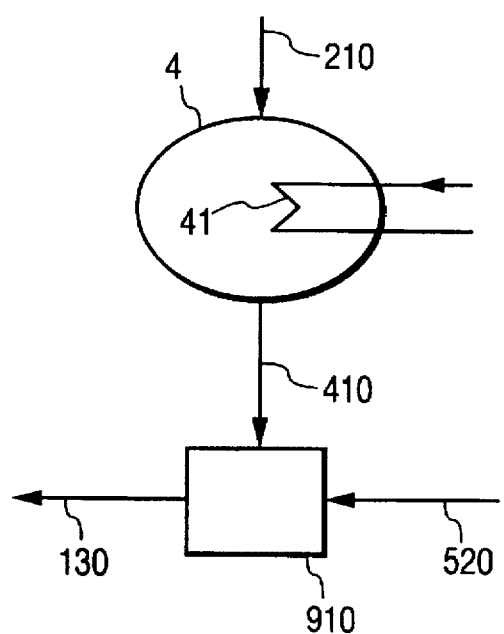
FIG. 11 is a schematic diagram indicative of an arrangement of a mixer suitable for implementing the invention.

With reference to FIG. 8, a schematic flow diagram of still more embodiment of the invention will be described. In this embodiment, a portion of hot water after operating refrigerator 5 is branched from pipeline 520 to pipeline 521 to be supplied as heat source for use in air-conditioning to facilities within and outside the refuse incineration compound. Likewise as described above, if a destination of heat to be supplied through the pipeline 521 is to a district air-conditioning plant, heat production facilities for the district air-conditioning plant can be substantially reduced.

Naturally, any such system combining the cold water supply line as depicted in FIG. 7 and the hot water supply line as depicted in FIG. 8 at the same time should be construed to be within the scope of the invention.

According to any of the embodiments of the invention described hereinabove, since Rankine cycle power generation with an improved efficiency is possible, firstly, there is an advantage that a significant gain can be attained in the profit due to sales of electricity generated in the refuse incineration power generation plant.

Secondly, since facilities pertaining to the refuse incinerator and those pertaining to the power generation are relatively easy to separate from each other, even when such an instance occurs that the power generation operation is difficult to maintain, for example, due to a failure in the power generation equipment or its inspection, the refuse incineration operation can be maintained stably without interruption.

Further, if a particular time zone when a full-scale power generation operation is difficult to maintain falls within a capacity to allow a further heat storage (for example, within a capacity of the absorption solution storage vessel), most of the steam produced can be utilized for heat storage operation in the heat storage facility without discharging surplus steam out of the system, thereby there is such an advantage that no steam is wasted.

Thirdly, since the fluctuation absorption function is provided to absorb the fluctuation in the steam production by the heat storage facility according to the invention, constant discharging of surplus steam to outside the system is no more necessary as followed in the conventional method, thereby there is such an advantage that a use ratio of the steam available through refuse incineration heat recovery can be improved significantly.

Fourthly, there is another advantage that since it is possible to supply cold heat or hot water or both from the refuse incineration exhaust heat power generation plant to the other facilities including the district air-conditioning plant, substantial reductions in the heat production equipment in such district air-conditioning plant and in consumption of electricity at the customers' facilities can be achieved. Further, there is another advantage when the cold and hot heat sources are supplied to the customer on the commercial base that an increased profit in addition to the sales of electricity can be attained.

By way of example, the refuse incineration exhaust heat power generation system has been described herein particularly as a preferred object to apply the embodiments of the invention, but it is not limited thereto, and it should be construed that various types of power generation systems having a heat engine based on a Rankine cycle including a combined power generation system which combines a gas turbine power generation system and a refuse incineration exhaust heat generation system are also within the scope of the invention.

As have been described hereinabove, there has been provided the Rankine cycle power generation system capable of a stable and continuous operation of refuse incineration task, utilizing most effectively the incineration exhaust heat, and having an improved Ranking cycle efficiency.

What is claimed is:

1. A method for operating a Rankine cycle power generation system having the steps of generating a heat in a boiler, flowing a medium into said boiler to generate a vapor of said medium, directing said vapor output therefrom to a steam turbine which is coupled to a generator which generates electricity, and condensing said vapor of said medium discharged from said turbine into a condensate which is circulated to said boiler, wherein the method comprises the steps of:

allowing said vapor to fluctuate its output amount;

ensuring a predetermined amount of the vapor of said medium to be directed to said steam turbine for driving the same;

relieving a fluctuation in an output amount of said vapor by directing a surplus amount of said vapor of said medium exceeding said predetermined amount to another load; and converging a flow of the surplus amount of said vapor after having relieved said fluctuation with a flow of said condensate of said medium.

2. A method for operating a Rankine cycle power generation system having the steps of generating a heat in a boiler, flowing a medium into said boiler to generate a vapor of said medium, directing said vapor output therefrom to a steam turbine which is coupled to a generator to generate electricity, condensing said vapor of said medium discharged from said turbine into a condensate which is circulated to said boiler, and utilizing a cooling water produced in refrigeration means for producing said condensate in said condenser, wherein said boiler is a refuse incinerator, and wherein the method comprises the steps of:

driving said steam turbine to generate electricity using a predetermined amount of the vapor of said medium which is secured from a total output of vapor from said boiler;

driving said refrigeration means to obtain a cooling water or cold water source using a surplus amount of the vapor of said medium exceeding said predetermined amount;

dividing a day at least into a first time zone and a second time zone;

reducing generation of electricity and increasing production of cooling water or cold water source instead thereof in said second time zone of the day in comparison with said first time zone; and utilizing said cooling water or cold water source that has been obtained during said second time zone in said first time zone of the day.

3. A method for operating a Rankine cycle power generation system having the steps of generating a heat in a boiler, flowing a medium into said boiler to generate a vapor of said medium, directing said vapor output therefrom to a steam turbine which is coupled to a generator to generate electricity, condensing said vapor of said medium discharged from said turbine into a condensate which is circulated to said boiler, and utilizing a cooling water produced in refrigeration means for producing said condensate in said condenser, wherein said boiler is a refuse incinerator, and wherein the method comprises the steps of:

driving said steam turbine to generate electricity using a predetermined amount of the vapor of said medium which is secured from a total amount of vapor from said boiler;

driving said refrigerator using a surplus volume of the vapor of said medium exceeding said predetermined volume to obtain a cooling water or cold water source;

dividing a day at least into two time zones according to a unit price of electricity, the unit price differing with time;

reducing the predetermined amount of said vapor which is secured for said steam turbine in a time zone of the day when the unit price of electricity is lower in comparison with that of another time zone when the unit price of electricity is higher;

at the same time increasing production of cooling water or cold water source; and utilizing said cooling water or cold water source which has been obtained during said time zone when the unit price of electricity was lower, in said another time zone when the unit price of electricity becomes higher for producing said condensate in said condenser.

4. A Rankine cycle power generation system having a boiler including a heat exchanger through which a medium flows, a steam turbine coupled to a generator, and a condenser for condensing a vapor of said medium which is discharged from said steam turbine, a condensate of said vapor being circulated to said boiler, wherein said boiler allows a total amount of vapor of said medium produced therein to fluctuate relative to a constant fuel input, and wherein a predetermined amount of vapor of said medium which is smaller than a minimum amount of vapor of said medium available subject to said fluctuation is supplied to said steam turbine; and a surplus amount of vapor of said medium exceeding said predetermined volume, after damping said fluctuation appearing in the total volume of the vapor, is caused to converge with said medium having passed through said condenser.

5. A Rankine cycle power generation system having a boiler including a heat exchanger through which a medium flows, a steam turbine coupled to a generator, a condenser for condensing a vapor of said medium which is discharged from said steam turbine, a condensate of said vapor being circulated to said boiler, and refrigeration means from which a cooling water is supplied to said condenser, wherein said boiler is a refuse incinerator;

a portion of vapor of said medium produced in the refuse incinerator is supplied through a branch which is provided in an upper stream of said steam turbine to said refrigerator, then condensed to a condensate which is converged with the medium from said condenser; and said refrigeration means is a refrigerator which is driven by said medium vapor, said refrigerator having a storage vessel for storing a cooling water or cold water producing source which has been obtained through operation of said refrigerator.

6. A Rankine cycle power generation system according to claim 5, wherein said branch portion comprises flow control means for directing said predetermined amount of vapor of said medium to said steam turbine, and directing said surplus amount of vapor exceeding said predetermined amount to said refrigerator.

7. A Rankine cycle power generation system according to claim 5, wherein the surplus amount of the vapor of said medium to be supplied to said refrigerator is allowed to change in accordance with a particular time zone of a day which is divided into at least two portions.

8. A Rankine cycle power generation system according to either one of claims 5 to 7 wherein the Rankine cycle power generation system comprises supplying a combustion gas from said refuse incinerator to said refrigerator as a heat source to operate the same.

9. A Rankine cycle power generation system according to either one of claims 5 to 7 wherein said boiler comprises a second heat exchanger through which a second medium flows, the second medium flowing through the second heat exchanger being directed to said refrigerator to supply heat thereto.

10. A Rankine cycle power generation system according to either one of claims 5 to 7 wherein at least one of said medium, said vapor of said medium and said combustion gas to be directed to said refrigerator to supply heat thereto is caused to pass through a heat exchanger for exchanging heat with a condensate of a first medium discharged from said condenser before reaching said refrigerator.

11. A Rankine cycle power generation system according to either one of claims 5 to 7, further comprising a storage vessel for storing said cooling water.

12. The Rankine cycle power generation system according to either one of claims 5 to 7, wherein a portion of said cooling water produced in said refrigerator is circulated to said refrigerator after having been supplied to a load.

13. A Rankine cycle power generation system according to either one of claims 5 to 7, wherein at least a portion of said medium is circulated to said refuse incinerator after having been supplied to the refrigerator then to a load.

* * * * *